(12) United States Patent
Caldwell

(10) Patent No.: US 7,036,773 B2
(45) Date of Patent: May 2, 2006

(54) COMPACT EXTERNAL LAUNCHER FOR SMALL SPACE PAYLOADS

(75) Inventor: Douglas W. Caldwell, Glendale, CA (US)

(73) Assignee: Ecliptic Enterprises Corporation, Pasadena, CA (US)

(*) Notice: Subject to any disclaimer, the term of this patent is extended or adjusted under 35 U.S.C. 154(b) by 0 days.

(21) Appl. No.: 10/651,226

(22) Filed: Aug. 28, 2003

(65) Prior Publication Data
US 2005/0045771 A1    Mar. 3, 2005

(51) Int. Cl.
*B64G 1/00* (2006.01)

(52) U.S. Cl. .................. 244/173.3; 244/137.4

(58) Field of Classification Search ............ 244/158 R, 244/159, 160, 161, 136, 137.4, 158.1, 158.5, 244/172.1, 173.1, 173.3
See application file for complete search history.

(56) References Cited

U.S. PATENT DOCUMENTS

| | | | | |
|---|---|---|---|---|
| 5,143,327 A | * | 9/1992 | Martin | 244/171.3 |
| 5,409,187 A | * | 4/1995 | Dunham | 244/149 |
| 5,927,653 A | * | 7/1999 | Mueller et al. | 244/171.3 |
| 6,019,317 A | * | 2/2000 | Simmons et al. | 244/138 R |
| 6,119,985 A | * | 9/2000 | Clapp et al. | 244/171.4 |
| 6,494,406 B1 | * | 12/2002 | Fukushima et al. | 244/173.3 |
| 6,498,767 B1 | * | 12/2002 | Carreiro | 367/4 |
| 6,685,141 B1 | * | 2/2004 | Penn | 244/162 |
| 6,712,319 B1 | * | 3/2004 | Kiselev et al. | 244/171.1 |

FOREIGN PATENT DOCUMENTS

| EP | 381869 A | 8/1990 |
|---|---|---|
| JP | 03350449 | 11/1991 |
| JP | 04228399 | 8/1992 |

OTHER PUBLICATIONS

"Astronomy Picture of the Day", APOD: Sep. 16, 2002—An Atlas V Rocket Prepares to Launch, www.antwrp.gsfc.nasa.gov/apod/ap020916.html, pp. 1-3, Sep. 16, 2002.*
"10:00am RocketPod: A method for Launching CubeSat-Class Payloads on ELVs and Spacecrat"Caldwell, Session X: Launch Standards: Small Satellite Conference, Utah State University,www.smallsat.org, Aug. 11, 2005, pp. 1-5.*
"Space Test Program PICOSat Satellite", ARGOS "Fact Sheet United States Air Force", www.losangeles.af.mil/SMC?PA?Fact_Sheets/PICOSat.htm.*
"Hitchhiker Ejection System (HES)", pp. 1-5, http://ssp.arizona.edu, pp. 1-5.*
"Experimental Picosatellites Launch from Space Shuttle", www.aero.org, pp. 1-2.*
Ecliptic Enterprises, "RocketCam Digital Video System" Brochure, Aug. 6, 2002, 4 pages.
Rapport De Recherche Preliminaire, FA 659452, FR 0409146, 19 Juillet 2005.

* cited by examiner

*Primary Examiner*—Teri Pham Luu
*Assistant Examiner*—S A Holzen
(74) *Attorney, Agent, or Firm*—Blakely Sokoloff Taylor & Zafman LLP

(57) ABSTRACT

The present invention allows a payload to be launched from the exterior of a conventional launch vehicle with little integration expense. In one example, the invention includes an aerodynamic fairing having an internal cavity to contain a payload, a mounting adapter to attach the fairing to an exterior surface of a launch vehicle, and a release mechanism to separate the payload from the launch vehicle out of the fairing cavity during the launch vehicle's flight.

28 Claims, 2 Drawing Sheets

COMPACT EXTERNAL LAUNCHER FOR SMALL SPACE PAYLOADS

BACKGROUND

1. Field

The present invention applies to the field of launch systems for small space payloads and, in particular, to deploying a small payload from the exterior of a space launch vehicle.

2. Background

Commercial, scientific and educational institutions are developing or have developed very small satellites, spacecraft and space instruments. These new small devices have a wide range of applications and uses. One goal of such small satellite development programs is to lower the cost and development cycle time as compared to conventional earth-orbiting and interplanetary spacecraft. Costs are reduced primarily through simplification and miniaturization. The number of functions as well as the length of the mission can be reduced to lower costs.

Small spacecraft have been classified into different types. The current classifications are not precise or controlling but indicate the variety of very small spacecraft. New spacecraft are under development which may or may not fit into any existing category. Smallsats are typically considered to be small spacecraft or small satellites weighing less than about 200 kg. Nanosats, "nano-spacecraft" or "nano-satellites" are typically considered to be a particularly small category of smallsats which might weigh between 1 kg and 10 kg. Other smallsats can be smaller still. The CubeSat Project is a collaborative effort between California Polytechnic State University San Luis Obispo, and Stanford University's Space Systems Development Laboratory. It provides a standard for the design of smallsats so that a common deployer is used. Currently more than 30 high schools, colleges, and universities from around the world are developing CubeSats. The CubeSat standard specifies each satellite as a 10 cm cube of 1 kg maximum mass and provides additional guidelines for the location of a diagnostic port, remove-before-flight pin, and deployment switches. For reference, a typical commercial communications satellite weighs over 3,000 kg.

Smallsats, if they can be launched inexpensively and with a short development and integration time offer a new era in space science, development and exploration. Launch costs are generally a function of size (both mass and volume), so smaller payloads should be cheaper to launch. While many organizations have built or are building Smallsats, there is no inexpensive and quick way to launch such small payloads. As a result, many of the advantages of smallsats are lost. Current launch vehicles are designed for large, heavy, and expensive payloads on the order of 2,000 kg and up.

Some nanosats have been released from the Space Shuttle cargo bay, these launches required individual human attention and special provisions within the Space Shuttle cargo bay. Smallsats have been launched on conventional expendable launch vehicles, and the Delta, Pegasus, and Ariane programs have developed special adapters to carry secondary payloads within their primary payload fairings. However, for each such launch, a great amount of customization, analysis, and safety review is required for each smallsat.

The most developed and readily available smallsat launcher is the Ariane Structure for Auxiliary Payloads (ASAP). For Ariane 5, the ASAP can carry up to eight satellites weighing up to 80 kg each, or up to four satellites weighing 300 kg each within the primary payload fairing. However, launch vehicle preparations still require 12 to 24 months. This is often longer than the development time for the payload itself. The ESPA ring being developed for Delta IV and Atlas 5 will not launch until 2005 at the earliest, partly due to the difficulty of coordinating its various secondary payloads. Both ESPA and ASAP interact significantly with their respective rockets because they are placed directly in the load path with the primary payload.

SUMMARY

The present invention allows a payload to be launched from the exterior of a conventional launch vehicle with little integration expense. In one example, the invention includes an aerodynamic fairing having an internal cavity to contain a payload, a mounting adapter to attach the fairing to an exterior surface of a launch vehicle, and a release mechanism to separate the payload from the launch vehicle out of the fairing cavity during the launch vehicle's flight.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

The present invention provides a simple and inexpensive way to launch small satellites, spacecraft and other payloads using expendable launch vehicles. Very little time is required for payload integration and the payload, if separated, can be ejected at almost any point in the launch vehicle's trajectory. Integration can be greatly simplified by separating the secondary payload's deployment from the primary payload within the launch vehicle's primary payload fairing.

For purposes of the description below, all smaller payloads, whether spacecraft, satellites or other payloads that are significantly smaller than a launch vehicle's primary payload will be referred to as smallsats, regardless of mission, flight path and longevity. This includes smallsats, nanosats, picosats, microsats, CubeSats and other payloads between about a few tens of kilograms and a few hundred grams. The meaning of small, accordingly, depends upon the size of the launch vehicle and its payload.

Figure 1:
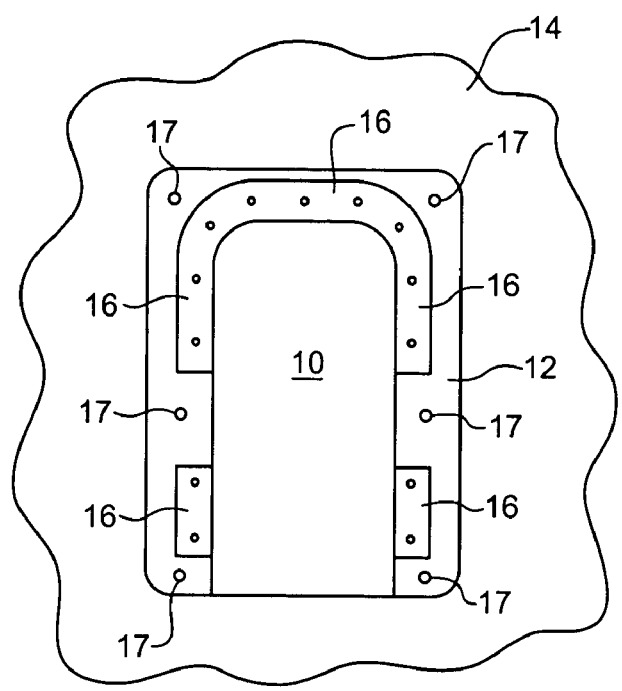
FIG. 1 is a plan view of a mounting adapter attached to the exterior surface of a launch vehicle.
Figure 2:
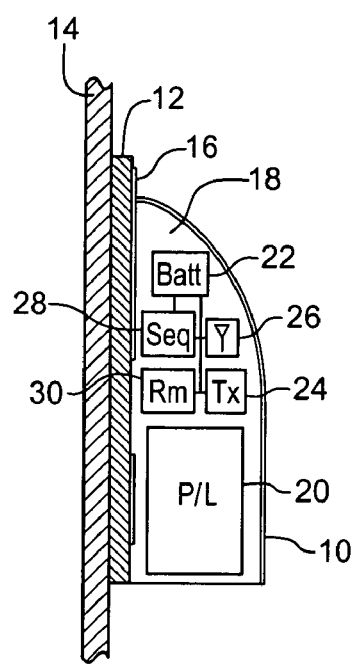
FIG. 2 is a cross-sectional view of an external payload launcher attached to the exterior surface of a launch vehicle according to one embodiment of the present invention.
Figure 3:
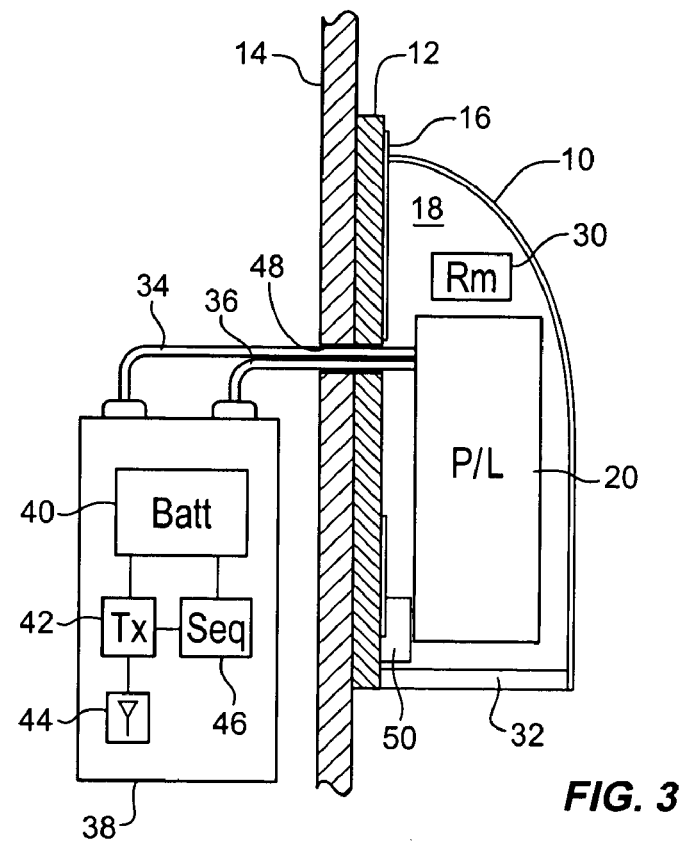
FIG. 3 is a cross-sectional view of an external payload launcher attached to the exterior surface of a launch vehicle according to another embodiment of the present invention.

As shown in FIG. 1, an external launcher can be attached directly to the exterior surface of a rocket or other type of launch vehicle 14 with little impact on the rocket. As shown, the external launcher includes an aerodynamic fairing 10 that is attached using a mounting interface 12. As shown in FIGS. 2 and 3 and as will be discussed below, the aerodynamic fairing has an internal cavity that contains a payload and various supporting components. The payload can be any of a variety of different types including any of the smallsats mentioned above. The payload can range from an autonomous spacecraft capable of independent powered flight to a science instrument that is attached to the rocket and activated without being separated from the launch vehicle.

The fairing is relatively small compared to the rocket. For example, a 80×80×140 mm, 2 kg nanosat, may be contained within a 12 cm×25 cm fairing. This is small when compared to, for instance, the expendable Delta 7925 launch vehicle, which is 2.4 m diameter and 38.1 m long. The particular size of the fairing will depend on the payload. It can probably be much smaller for a 0.1 kg smallsat than it will be for a 20 kg smallsat. The fairing protects the smallsat payload during launch. It can be designed to reduce aerodynamically-induced mechanical and thermal stresses on both the secondary payload and the launch vehicle during their travel through atmosphere, as can be seen in FIGS. 2 and 3. The particular aerodynamic design can be optimized for mission demands and objectives or it can be designed for general application.

The external launcher fairing can be made of any of a variety of different materials that can withstand the aerodynamic, thermal, and vibration loads that may be encountered. Aerospace-grade aluminum and graphite-epoxy composites are examples of suitable materials. The fairing might additionally be covered with a suitable thermal protection substance (e.g., cork). The fairing can be transparent or semi-transparent, or have transparent or semi-transparent segments, where transparency is a function of some useful wavelength of the electromagnetic spectrum (e.g., optical, IR, or RF). This can allow the payload to be viewed, inspected or communicated with during installation, integration, and operation.

The external launcher fairing 10 is attached to or can be constructed integrally with the mounting interface. In some embodiments, and as shown in FIG. 1, the mounting interface is an adapter in the form of a discrete plate provided by the launch vehicle manufacturer to ensure that it is easily and safely integrated with the launch vehicle. The mounting adapter can take many different configurations depending upon the launch vehicle and the payload. In one embodiment, it is a solid aluminum plate with attachment points 16 to attach the fairing to the mounting plate and attachment points 17 to attach the mounting plate to the rocket. The attachment points 17 can be through-holes to accommodate fasteners, such as machine screws or bolts that fasten to threaded receivers or nuts in the launch vehicle's skin or interior. The attachment points can also be bonding pads, welding points, etc. depending upon the type of fastening method preferred for the particular application.

As an alternative to the mounting adapter, the mounting interface between the fairing and the launch vehicle can be attachment points integrated with the fairing or with a housing of the smallsat payload. This mounting interface can be made of the same or different materials from the fairing.

The launch vehicle can be any of a variety of different types. The present invention is well-suited for conventional expendable solid or liquid fueled rockets, such as the Delta, Atlas, Titan, Pegusus, Taurus, Ariane, Proton and Zenit lines of rockets. It can also be attached to strap-on boosters and external tanks used by some rockets and spacecraft. Any expendable or reusable rocket can be used, regardless of system architecture. The invention is not dependent on any particular aspect of the vehicle (e.g., whether it depends on solid, liquid, hybrid, or air-breathing propulsion) other than that it has an external surface on which to mount the payload. Examples other than expendable launch vehicles include sounding rockets, and various reusable vehicles being developed (e.g., Kistler, SpaceShipOne). Due to the large size (external dimensions) and cargo capacity of such comparatively large rockets, the aerodynamic drag and weight of the external fairing and payload described herein will normally have a negligible impact on launch vehicle's performance.

The relatively small drag and weight of the mounting interface, fairing and smallsat allow a payload to be added to scheduled launches without impacting the launch schedule or substantially affecting the performance available to the primary payload. When a nanosat or smallsat is attached to any of the Delta, Atlas, Titan, Pegusus, Taurus, Ariane, Proton and Zenit lines of rockets, the mass of the payload and its supporting infrastructure will be less than or comparable to the mass uncertainty usually attributable to the final weighing process for the primary launch vehicle payload. For example, a typical 2 kg nanosat deployed from a fairing as described herein will add about 4 kg to the total mass of the launch vehicle. For comparison, a Delta 7925 has a liftoff mass of 232,000 kg, carrying a 5000 kg payload to low Earth orbit.

The mounting adapter can be attached almost anywhere on the exterior of the launch vehicle. One typical suitable location is high on the outside of the launch vehicle's skin, e.g., on the skin of an instrumentation section. However, the launcher can also be attached to fuselage, tank, or to booster portions of the launch vehicle if preferred. The instrumentation section can be better for some applications because it usually is designed to reach orbit, because it has some extra interior space for supporting components and because it has an electric power supply that can be used to support the externally mounted payload or a release mechanism.

On a typical expendable rocket, there is enough room and carrying capacity available on the skin for several external payloads to be attached. A number of external launchers symmetrically arrayed about the launch vehicle can balance the aerodynamic and other forces attributable to the external payloads and any supporting fairings, release mechanisms and supporting components. If enough extra lift capacity is available, a dense ring of payloads with supporting components could be placed around a section of the launch vehicle. Each separate stage of the launch vehicle can carry a group of smallsat payloads. If many of the carried payloads are not to be separated, these could be placed in another row, further adding capability. Because the combined mass of an individual external launcher and its secondary payload is relatively small, the assemblies can be incrementally added to an available launch as appropriate to use available payload mass margin. This allows even more flexibility with respect to scheduling secondary payload launches. For example, several rows of six to twelve external launchers can be attached to a launch vehicle outer skin without adding significantly to the complexity or build time of the launch vehicle.

FIG. 2, a cross-sectional view of one embodiment of the external launcher, shows components that can be housed within the aerodynamic fairing 10. The illustrated fairing is curved at the upper end, which is pointed in the direction that the rocket or launch vehicle travels. The fairing has an internal cavity 18 that contains the payload 20. As mentioned above, the payload can be any of a wide variety of different satellites, spacecraft, instruments, experiments, demonstrations, etc. The payload can be a nanosat of about 2 kg or less, or it can be significantly heavier. If the payload is on the order of 2 kg or less (depending on the vehicle), it can be easily added to a launch vehicle exterior with almost no modification of the launch vehicle and no change to its primary payload or mission design. Heavier payloads can also be accommodated by the external launcher.

The internal cavity 18 of the fairing 10 contains a release mechanism 30 which retains the payload before separation, then releases it, ejects it, or deploys it. The release mechanism can rely on outside forces, such as angular acceleration or drag to eject the payload or it can include a distinct ejection mechanism (not shown) to provide a positive force to ensure ejection. The release mechanism can be constructed in any of a variety of different ways well known in the art. The release mechanism can use a pyro, a non-explosive actuator, a solenoid, a motor, a wax actuator, a memory metal, or any of a number of other devices well known in the art. The ejection mechanism can use a spring, a pyro, a solenoid, a motor, a pneumatic system, or any of a number of other devices well known in the art.

As shown in FIG. 2, the external launcher fairing is open at one end and the payload can be ejected out the end opposite the direction of travel of the launch vehicle. This sends the smallsat payload away from and clear of the launch vehicle so that the payload does not interfere in any way with the primary payload (whether the primary payload is released later or earlier). Alternatively, the fairing can be mounted to a hinge or slide, so that it can be moved away from the payload. The payload can then be ejected laterally away from the launch vehicle exterior.

In the example of FIG. 2, the smallsat payload is accompanied by supporting components on the exterior of the vehicle that render the external launcher completely self-contained. These components include a power supply 22, such as a battery or fuel cell. The power supply powers the payload and other components during the flight with the launch vehicle. The components can also include a radio transmitter, receiver or transceiver 24, and antenna 26. Alternatively, components within the payload can be used instead of providing for separate supporting components. The external supporting components can allow the payload to communicate with a ground station for command, control, telemetry or data transmission.

A timer or sequencer 28 can also be included to trigger various operations to be performed by the payload. The sequencer can run autonomously or can be controlled through the receiver. The sequencer can be used, for example to trigger the release mechanism. As an alternative or in addition to the sequencer, an environmental sensor can be used to initiate payload separation or activation. The environmental sensor can sense temperature, pressure, acceleration or some other parameter, then when this or some combination of parameters reach a certain condition, a trigger signal can be generated. In this way, when the launch vehicle reaches a certain altitude or a certain point in its flight path, the payload can be activated, ejected or separated.

Any one or more of the supporting components can be integrated into the payload or not used. Additional components can also be added as may be appropriate to the mission of the particular payload. The external launcher can be built with standardized dimensions, so that payload designers can pack the internal cavity with those components that they believe to be most appropriate for a particular payload and its mission.

In one embodiment, as shown in FIG. 2, the cavity is open at its bottom end. In another embodiment, as shown in FIG. 3, the internal cavity has a port 32 that seals off the internal cavity. When the payload is to be ejected, the port is opened, releasing the payload or allowing the payload to be released by a separate mechanism. The port can be released and ejected or attached, such as by hinges, so that it stays with the launch vehicle. The payload can be placed within the internal cavity so that it is released after the port is opened. This approach potentially simplifies the ejection mechanism and potentially adds a layer of safety for the launch vehicle. Alternatively, the payload can be held within the internal cavity by some other attachment for safety reasons, vibration isolation, or for any other reason. This attachment and the port can be operated by the same or by different ejection mechanisms. If different mechanisms are used, a level of fault tolerance is achieved, thereby adding confidence that the payload will not be prematurely released.

In another embodiment, nothing is released or ejected. The payload remains attached to the launch vehicle. In such an embodiment, the payload does not require flight independent of the portion of the launch vehicle to which it is attached. Accordingly, the attached payload follows the same path as the portion of the launch vehicle to which it is attached. Such a payload can be used, for example, to measure some externally viewable part of the earth or the skies or some characteristic of launch vehicle performance or to measure some aspect of how an upper stage burns up during reentry into the upper atmosphere. In the latter case, the payload can be designed to withstand a portion of the reentry environment while it is making measurements.

In another embodiment, the payload 20 is not ejected or released. The payload is deployed by moving the aerodynamic fairing 10 to expose the payload. In this embodiment, the fairing can be ejected off the launch vehicle skin using any of the release and ejection devices described above. Alternatively, the fairing can be retained in some fashion, such as by hinges or a sliding mechanism. Hinges might move the fairing to one side. A sliding mechanism might move it forward or sideways away from the payload A variety of other mechanisms and approaches can also be used. A fairing release can allow a part or all of the payload to be exposed. Such an approach can be useful if the payload does not require free flight but requires a greater degree of exposure than would normally be afforded with the aerodynamic fairing in place. For example, if the secondary payload were to remain attached to an orbited upper stage but be required to continue operating for an extended time, ejecting or moving the fairing could allow solar panels to be exposed and generate power for the payload.

In another embodiment, the aerodynamic fairing forms a part of the payload and the fairing 10 is ejected from the mounting adapter 12 together with the payload 20 as a single integrated unit. This allows the payload to be ejected laterally from the launch vehicle and allows the payload to benefit from the additional structure and protection of the fairing.

FIG. 3 shows a cross-sectional view of the external launcher in another embodiment in which many components are housed within the launch vehicle. In FIG. 3, the supporting components placed within the launch vehicle are connected via cables 34 and 36 to the exterior. This can be done to minimize the amount of equipment that must be carried externally and maximize the volume and mass available for the smallsat. Placing the supporting components inside the launch vehicle can alleviate some of the packaging considerations (e.g., of mass, volume, or environmental requirements) that might apply if these components are placed within the external fairing. Additionally, by separating the supporting components from the external payload, it is possible to connect the same supporting components to more than one external launcher. In this way, these components can support several payloads or launchers.

The supporting components can include a power supply 40, such as a battery. The power supply can be used to power the payload and other components during the flight with the launch vehicle and to provide power for the release or ejection mechanism. The components can also include a radio transmitter, receiver or transceiver 42, and antennas 44. The supporting components can allow the payload to communicate with a ground station for command, control, telemetry or data transmission.

A timer or sequencer 46 can also be included to trigger various operations to be performed by the payload. The sequencer can run autonomously or can be controlled by the launch vehicle or through the receiver. Special signals necessary for actuating any of the mechanisms can be included in the sequencer or provided as a separate element. Any one or more of the supporting components can be integrated into the payload or not used. Additional components can also be added as may be appropriate to the mission of the particular payload. The external launcher can be built with standardized dimensions to make it easier for payload designers to pack the internal cavity of the fairing with components that they believe to be most appropriate for a particular payload and its mission.

An alternative embodiment, not shown, incorporates some or all of the supporting components within the fairing 10 but nonetheless has an electrical cable connecting to the launch vehicle. This approach allows the selection of the location of the supporting components to be optimized. The electrical cable between the external launcher and electrical components inside the launch vehicle (either supporting components or other launch vehicle electronics) is routed through a hole 48 in the vehicle skin 14. The cable can carry electrical power; command, control, or telemetry signals; RF signals; or other signals as may be appropriate. In an alternative embodiment, also not shown, some or all of the signals can be conveyed outside of the external launcher (either to the exterior of the integrated launch vehicle or through the launch vehicle's skin) using RF, optical, or inductive means. Such methods can further simplify the integration process.

The supporting components in FIG. 3 can be packaged inside a housing 38 that provides isolation and insulation from the launch vehicle interior. It can also provide a convenient package for spacecraft integration. This housing can be attached to the launch vehicle interior in any of a variety of different ways (not shown). The supporting components inside will depend on the payload and its mission. In many applications, such components may include a power supply 40, such as a battery or fuel cell, a transceiver 42, antenna 44, and timer or sequencer 46. The power supply can be used to power the supporting components inside the housing, thereby reducing demands on payload components or supplying capabilities beyond those of the payload. For example, the sequencer can be used to determine when to eject the payload, so that the payload does not need to have any ability to determine when to eject. The transceiver can be used to receive commands from the ground station and transmit telemetry, so that the payload does not need to be able to determine telemetry data during the launch phase.

The power supply can connect to components inside the external launcher housing using a power umbilical cable 34 that extends through an opening 48 in the launch vehicle's exterior. The umbilical can connect to the payload or to any other components in the internal cavity of the external launcher that may require power before or after ejection. Such a power umbilical can be used to preserve power resources of the payload until after ejection.

A second umbilical 36 can connect to the payload or other components through the same opening 48 for data communication. This umbilical can be used to exchange data with the payload or to activate the ejection mechanism or for a variety of other purposes. One application of the data umbilical can be to activate the payload at an appropriate time before ejection. With this arrangement, the payload can be powered down during all launch phases and then wait until just before deployment before it is activated. While two umbilical cables are shown, more or fewer can be used. The data can be carried over the same wires that carry power, or different cables can be used for different kinds of data or different connections. The connections can be electrical, optical, inductive or RF (radio frequency). Alternatively, an electromagnetic connection can be made through the launch vehicle exterior without using umbilical cords and an aperture in the launch vehicle exterior. Inductive and radio communication can be used to connect the components inside the launch vehicle with those outside the launch vehicle.

These connections can be released using the same mechanism that separates the payload or using a different mechanism. Alternatively, they need not be released. Optical, inductive, and RF connections can be configured so that they can still be used to communicate with the supporting components or the launch vehicle after the payload is separated.

As mentioned above, the embodiment of FIG. 3 shows a port 32 that is released by a separate port ejection mechanism 50. This mechanism can release a latch on the port, eject the entire port, or forcibly open the port. Any type of release or ejection mechanism applied to similar mechanical devices can be used. Once the port is opened, the payload can be pushed out of the external launcher by a payload ejection mechanism 30 (e.g., a simple spring) or by a thruster onboard the payload. If the payload is released before atmospheric aerodynamic drag becomes trivial, then the differential aerodynamic drag between the launch vehicle and the smallsat payload will further accelerate separation between the payload and the launch vehicle. A set of guide rails (not shown) can be used to guide the payload out of the fairing. Springs of any of a variety of different kinds can be used to move the payload along the guide rails.

Figure 4:
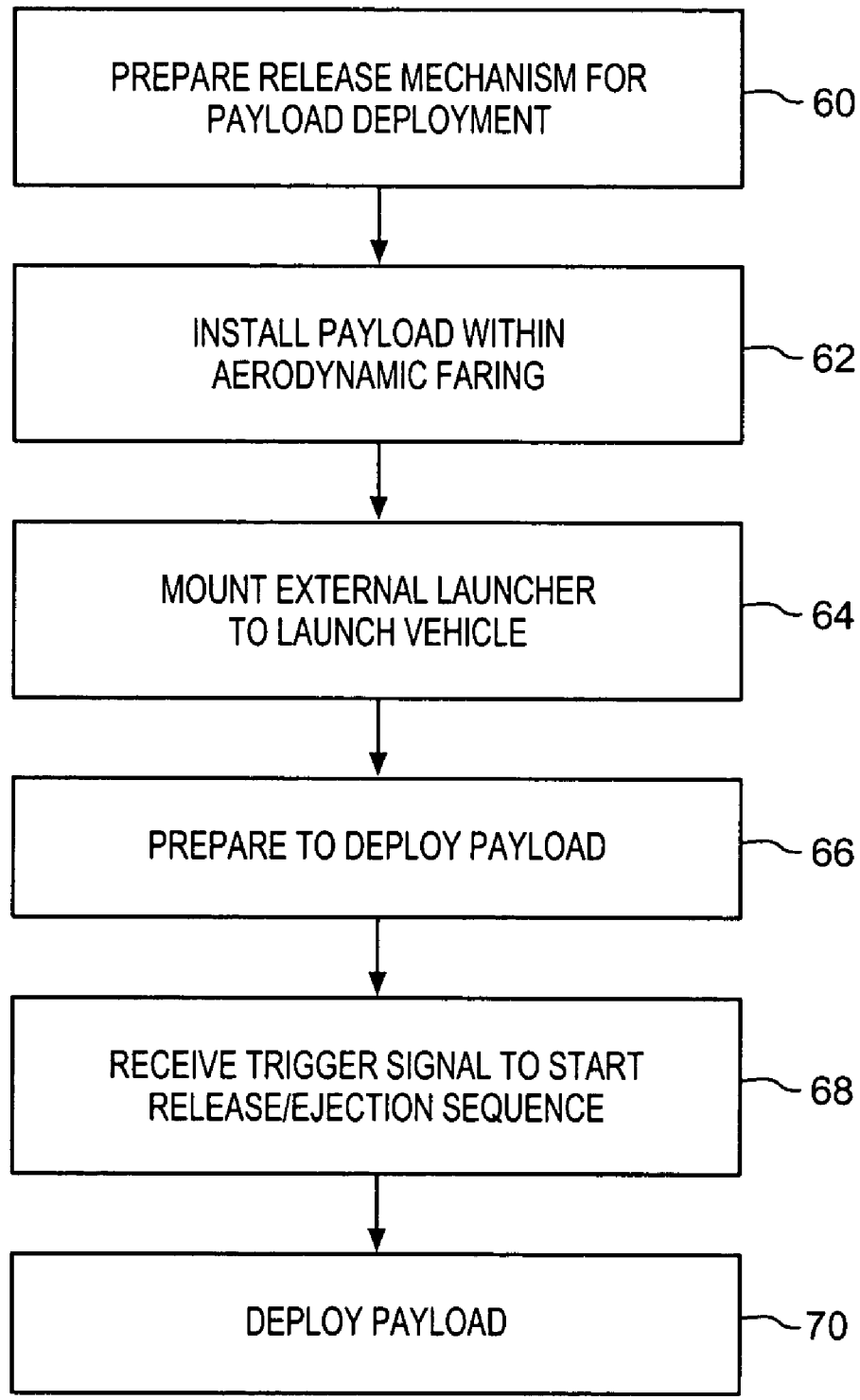
FIG. 4 is a diagram showing a method of launching small spacecraft according to an embodiment of the present invention.

FIG. 4 shows an example sequence of operations for integration and launch according to the present invention. Details of spacecraft design and integration are not included in order to simplify the description. The process of FIG. 4 begins with preparing the release mechanism for activation 60. Next the payload is incorporated into the external launcher 62. The fairing and payload assembly can then be mounted to the exterior skin of a launch vehicle 64. Alternatively, the fairing can be attached to the launch vehicle and then the payload can be integrated into the fairing.

Prior to launch, all of the system parameters can be set and checked and the release mechanism set to deploy or separate the payload 66 at the appropriate time during the launch vehicle's flight. At that time, a trigger signal to start an ejection sequence is received 68. This signal can be generated by the payload, by its supporting components or in response to a transmission. Finally, the payload is deployed 70.

The payload can be deployed by ejecting the payload, by ejecting the fairing, by moving the fairing or in many other ways. In one embodiment, the payload is released when a port in the bottom of the fairing is opened. This allows the payload to glide away from the launch vehicle opposite its direction of travel.

In any of the embodiments discussed above in which the payload is separated, the payload carried by the external launcher can be released and ejected at any time during the launch vehicle's flight after lift-off and before or even during reentry. The release can be made completely independently of the release of the primary payload. This allows one or more small payloads to be released at different times at different trajectories or orbits before or after release of the primary payload or the primary payload's fairing. As a result, there is great choice in possible flight paths for the external payload with little or no impact on the primary payload and its mission.

In any of the embodiments described above, the various components and piece-parts can be fabricated using any of a variety of techniques well known in the art. Materials can include metallics, composites, plastics, or any of a variety of other materials. Parts can be formed using machining, forging, casting, layup, stereo-lithography, or any of a variety of other techniques. Electronic components can be constructed from off-the-shelf items or custom designed ones. The particular choice of materials and designs will depend upon the intended application.

What is claimed is:

1. An external payload launch system comprising:
   a launch vehicle having an interior and an exterior;
   a motor to boost the launch vehicle into an exoatmospheric flight path;
   a primary payload compartment in the launch vehicle interior to carry a primary payload;
   a primary fairing to protect the payload compartment;
   a secondary fairing mounted to the exterior of the launch vehicle to protect and contain a secondary payload in flight, the secondary payload having a mass less than one tenth the mass of the primary payload, and wherein a release mechanism within the secondary fairing releases the secondary payload in a direction opposite the launch vehicle's direction of travel,
   the release mechanism to separate the secondary payload from the launch vehicle during the launch vehicle's flight.

2. The system of claim 1, further comprising a power supply in the launch vehicle interior coupled to the secondary payload to support the secondary payload.

3. The system of claim 1, further comprising command control and telemetry components in the launch vehicle interior coupled to the secondary payload to support the secondary payload.

4. The system of claim 2 further comprising a mounting adapter to attach the fairing to the exterior surface of a launch vehicle.

5. The system of claim 4, wherein the mounting adapter is an integral part of the secondary fairing.

6. The system of claim 4, wherein the mounting adapter is an integral part of the secondary payload.

7. The system of claim 4, wherein the secondary fairing is mounted to the mounting adapter which is mounted to the exterior surface of the launch vehicle.

8. The system of claim 4, wherein the mounting adapter comprises a discrete plate with a plurality of attachment points.

9. The system of claim 2, wherein the secondary fairing comprises a monocoque graphite-epoxy structure.

10. The system of claim 2, wherein the release mechanism deploys the payload by releasing the payload from within the secondary fairing.

11. The system of claim 1, wherein the release mechanism comprises one or more non-explosive actuators.

12. The system of claim 1, further comprising a sequencer to initiate payload deployment by the release mechanism.

13. The system of claim 1, further comprising an environmental sensor to initiate payload deployment by the release mechanism based on a parameter sensed by the environmental sensor.

14. The system of claim 1, wherein the release mechanism deploys the payload in response to an external command.

15. The system of claim 1, wherein the release mechanism comprises an ejection mechanism for ejecting the payload.

16. The system of claim 15, wherein the ejection mechanism comprises guide rails and springs.

17. The system of claim 21 further comprising a port coupled to the release mechanism and opened by the release mechanism during deployment of the secondary payload to allow the secondary payload to exit the secondary fairing.

18. The system of claim 1, further comprising an umbilical cable to connect the secondary payload to components within the launch vehicle interior.

19. The system of claim 18, wherein the umbilical cable is adapted to provide power, commands and telemetry to the secondary payload.

20. The system of claim 18, wherein the umbilical cable is adapted to provide power, and commands to the release mechanism.

21. The system of claim 1, further comprising a mounting interface to attach the secondary payload, secondary fairing and release mechanism to the exterior surface of the launch vehicle.

22. The system of claim 21, wherein the mounting interface is integrated with the secondary fairing.

23. The system of claim 21, wherein the mounting interface is integrated with the secondary payload.

24. The system of claim 21, wherein the secondary fairing is mounted to a mounting adapter which is attached to the exterior surface of the launch vehicle through the mounting interface.

25. The system of claim 21, wherein the secondary faring has an internal cavity to contain the secondary payload and wherein the release mechanism separates the secondary payload by releasing the secondary payload from within the secondary fairing.

26. The system of claim 21, wherein the release mechanism moves the secondary fairing to expose the secondary payload.

27. The system of claim 21, wherein the release mechanism separates the secondary fairing from the launch vehicle with the secondary payload.

28. The system of claim 21, wherein the release mechanism moves the secondary fairing to expose the secondary payload.

* * * * *